United States Patent Office 2,906,601
Patented Sept. 29, 1959

2,906,601

PREPARATION OF WATER-SOLUBLE NITROGEN-PHOSPHORIC ACID COMPOUNDS

Alfred Koster, Dusseldorf-Oberkassel, and Friedrich Weldes, Dusseldorf-Benrath, Germany, assignors to Henkel & Cie. G.m.b.H., Dusseldorf-Holthausen, Germany No Drawing. Application December 18, 1956
Serial No. 628,986

Claims priority, application Germany December 24, 1955

11 Claims. (Cl. 23—106)

This invention relates to new and useful improvements in the preparation of water-soluble nitrogen-phosphoric acid compounds, and in particular, of water-soluble, nitrogen-phosphoric acid compounds, which contain amino and/or imino groups.

Water-soluble, nitrogen-phosphoric acid compounds are used as water softeners and in combination with detergents, the same having the ability to combine with the normally occurring curd-forming constituents of the water, such as the lime. These nitrogen-phosphoric acid compounds have been repeatedly described in the literature of the art but their exact constitution and structural formula is not yet fully known. The water-soluble nitrogen-phosphoric acid compounds were conventionally formed by reacting phosphorus pentoxide with ammonia. The effecting of this reaction on a commercial scale, however, involved difficulties, since a sublimated phosphorus pentoxide or phosphorus pentoxide suspended in an inert liquid had to be reacted with the ammonia in gaseous form. In addition, the reaction did not proceed to completion, and the yield, referred to the amount of ammonia used, was relatively low.

It was also proposed to form the water-soluble nitrogen-phosphoric acid compounds by reacting phosphorus pentoxide with urea. This reaction, however, did not prove satisfactory, as the same would occur rather violently with the formation of soluble and insoluble polymerization products of cyanuric acid which become slowly hydrolyzed in alkaline solution, and in this connection continuously developed small quantities of ammonia.

One object of this invention is a novel process for the preparation of water-soluble, nitrogen-phosphoric acid compounds, which avoids the above-mentioned disadvantages and which is excellently suited for commercial operation. This, and still further objects will become apparent from the following description.

It has now been found that the above-mentioned disadvantages may be avoided and that water-soluble, nitrogen-phosphoric acid compounds may be very easily obtained in high yields in a manner which is extremley easy to effect on a commercial scale by reacting the phosphorus pentoxide with an ammonium salt.

Examples of suitable ammonium salts which may be used in accordance with the invention, include ammonium bicarbonate, ammonium carbonate, ammonium acetate, ammonium chloride, and mixtures thereof.

The ammonium salts used may be anhydrous or may contain water of crystallization. In this connection, however, it is generally preferable to use ammonium salts which are free of water of crystallization, since, when using ammonium salts which contain water of crystallization, the moist final product may be produced, necessitating subsequent drying.

The process is simply effected by contacting the phosphorus pentoxide and the ammonium salt in a molar ratio of phosphorus and nitrogen of 1:1.25–3 and preferably 1:1.4–2.5. In this connection, the end water-soluble composition, which is formed of nitrogen-phosphoric acid compounds, has a mol ratio of phosphorus to nitrogen of 1:1.25–3 and preferably 1:1.4–2.5.

In a few cases, as, for example, when using ammonium bicarbonate as the ammonium salt, the reaction may be effected by merely mixing the components together at a normal temperature with no additional heating being required. If the reaction, however, does not start immediately upon the mixing together of the reactants, it is generally sufficient to heat the reaction mixture moderately at one spot and thus commence the reaction which will automatically proceed without the further addition of heat. The temperature required in these cases to start the reaction is generally between about 50 and 125, and preferably between about 60 and 100° C.

In the case of small batches, the reaction may also be initiated by adding a very small quantity of water to the reaction mixture, as, for example, at one spot in the reaction mixture. The quantity of water to be added in this connection may be, for example, about 0.02% by weight, referring to the mixture of starting components.

Thus, for example, if 1 mol of phosphorus pentoxide is mixed with 5 mols of ammonium bicarbonate and 1 drop of water is added to the mixture, the reaction takes place exothermally without any additional heat being necessary. From this reaction there is obtained a composition formed of nitrogen-phosphoric acid compounds which will slowly dissolve in cold water and which will immediately dissolve in hot water, forming a clear solution. This composition is an excellent water softener having a high combining power with curd-forming constituents of water, such as lime.

When effecting the reaction with more stable ammonium salts which require heat for decomposition, such as ammonium chloride, it may be necessary to heat the entire reaction mixture until the reaction commences. In this connection, temperatures of about 200 and 320, and preferably between about 250 and 300° C. are required.

It is advisable to continuously mix the reaction mixture during the reaction, as, for example, by means of suitable mixing devices, in order to facilitate the subsequent comminution of the reaction product.

The composition of the compounds prepared in accordance with the invention is not that of a homogeneous substance, as is frequently assumed in the available literature of the art. In contrast thereto, compounds show chromatographically that they are mixtures of substances containing nitrogen-phosphoric acid which are of different degrees of condensation from monomers through numerous intermediate stages up to highly condensed materials.

In spite of this, however, when proceeding in accordance with the invention, it is possible to produce compounds which, despite their chemical heterogeneity, have the same overall composition and the same properties, so that a uniform product is always assured.

The reaction products are generally directly recovered in the form in which they are to be used, and thus no subsequent purification is necessary. When using ammonium salts which contain water of crystallization, a moist product may be obtained, which requires a subsequent drying. This drying may be effected in the conventional manner with the use of heat and/or vacuum.

In certain cases, for example, when using ammonium acetate or ammonium chloride as the ammonium salts, residual traces of acids may remain in the reaction product. As this residual acid may lead to a hydrolytic cleavage of the reaction product upon long storage, it is preferable to neutralize the same. The neutralization may be effected in conventional manner with alkali, as, for example, $Na_2CO_3$, $NaHCO_3$, $K_2CO_3$, NaOH, or KOH, and mixtures thereof. These additions may be added directly to the reaction product after the completion of the reaction, or else may be added to the reaction mixture or the starting products prior to or during the reaction. The quantity should be sufficient to achieve the neutralization and a possible excess of alkali will not be detrimental.

The water-soluble, nitrogen-phosphoric acid compounds produced in accordance with the invention contain amino- and/or imino-groups, and may be used as water softeners in combination with detergents in the identical manner as the known water-soluble, nitrogen-phosphoric acid compounds. Compounds have proven most effective for water softening purposes within a pH range of 7–9.

The following examples are given by way of illustration and not limitation:

Example 1

273 grams of ammonium bicarbonate and 142 grams of phosphorus pentoxide are thoroughly mixed. The mixture is then briefly heated at one spot, the reaction which takes place by the splitting off of $CO_2$ being thereby started. The mixing is continued during the reaction, which comes to completion in about a minute. 235 grams of a compositon formed of nitrogen-phosphoric acid compounds are directly obtained without purification. The product is water-soluble. The total nitrogen content is 16.5%. The phosphorus content of the reaction product, calculated as $P_2O_5$ is 56.2%. The pH of a 1% aqueous solution, which has an excellent lime-combining power, is 8.2.

Example 2

A mixture of 316 grams ammonium bicarbonate and 142 grams phosphorus pentoxide is reacted in the manner described in Example 1. There are produced 240 grams of a water-soluble composition formed of nitrogen-phosphoric acid compounds having a nitrogen content of 18.21%. The phosphorus content of the reaction product, calculated as $P_2O_5$, is 59.5%.

An aqueous solution, which contains 2.4 grams per liter of this product and which may contain a conventional detergent, is able, at a pH of 8.5–9, to bind a calcium hardness of about 0.135 gram per liter corresponding to a water hardness of about 14 German hardness degrees, and thus act very effectively to soften the water.

Example 3

142 grams $P_2O_5$ and 228 grams $(NH_4).CO_3.1H_2O$ are mixed and the reaction commenced by adding a drop of water to this mixture. After about one minute, the reaction which takes place with the liberation of $CO_2$ is completed.

The reaction product obtained is freed in vacuum of adherent moisture. After drying, there are obtained 231 grams of a composition formed of nitrogen-phosphoric acid compounds having a $P_2O_5$ content of 61.4%. The final product contains 18.1% total nitrogen, 8.1% of which is present as amide or imide nitrogen.

Example 4

142 grams phosphorus pentoxide, 385 grams of ammonium acetate, and 120 grams of anhydrous sodium carbonate are mixed, and the mixture is heated to about 70–85° at one place until the commencement of the reaction. The mixing is continued during the reaction, which is complete after about 2 minutes. After cooling, there are obtained 542 grams of a composition formed of nitrogen-phosphoric acid compounds which has a $P_2O_5$ content of 26.2%. The compound contains 11.7% total nitrogen. 20% of the total nitrogen is present in the form of amide or imide nitrogen.

Example 5

160 grams ammonium chloride and 142 grams phosphorus pentoxide are mixed and the mixture is heated for about 25 minutes to about 275–300° C., hydrogen chloride escaping in considerable quantities. The mixing is continued during the heating. After cooling, there are obtained 247 grams of a composition formed of nitrogen-phosphoric acid compounds having a $P_2O_5$ content of 57.5% and a total nitrogen content of 16.8%. 9.7% of the total nitrogen is present as amide or imide nitrogen.

The product obtained in this manner after it has cooled is dissolved with the same quantity of anhydrous sodium carbonate in water. From this solution there is obtained, by spray-drying, a powder capable of storage, which is excellently suited for use as a water softener.

Example 6

395 grams of ammonium bicarbonate are mixed with 142 grams of phosphorus pentoxide in a mortar. The reaction commences by itself upon the mixing and is complete in about 1 minute. The mixing is continued during the reaction period. After the completion of the reaction, the product obtained is dried in vacuum. There are obtained 350 grams of a water-soluble composition formed of nitrogen-phosphoric acid compounds having a $P_2O_5$ content of 40.6%. The product contains 16.5% total nitrogen. 26.1% of the total nitrogen is present in the form of amide or imide nitrogen.

A detergent composition consisting of 28% of a composition formed of nitrogen-phosphoric acid compounds (prepared as described above), 20% alkylbenzene sulfonate, 40% pyrophosphate, and 12% soda, obtained by corresponding mixing of the said components, gives an excellent washing action.

We claim:

1. Process for the preparation of water-soluble, nitrogen-phosphoric acid compounds, which comprises contacting phosphorus pentoxide with a solid ammonium salt in a molar ratio of phosphorus to nitrogen of 1:1.25–3, whereby complete reaction occurs between the ammonia salt in solid state and the phosphorus pentoxide to provide said nitrogen-phosphoric acid compounds, and recovering the water-soluble, nitrogen-phosphoric acid compounds formed.

2. Process according to claim 1, in which said phosphorus pentoxide is contacted with said ammonium salt in a molar ratio of phosphorus to nitrogen of 1:1.4–2.5.

3. Process according to claim 1, in which said ammonium salt is an ammonium salt which is free of water of crystallization.

4. Process according to claim 1, in which said ammonium salt is selected from the group consisting of ammonium bicarbonate, ammonium carbonate, ammonium acetate, ammonium chloride, and mixtures thereof.

5. Process according to claim 4, in which said ammonium salt is free of water of crystallization.

6. Process according to claim 1, in which said ammonium salt is ammonium bicarbonate.

7. Process according to claim 1, in which said contacting is effected at a temperature ranging from normal to about 320° C.

8. Process according to claim 1, in which said contacting is effected at about normal temperature, and in which said reaction is initiated by spot heating a portion of the reaction mixture.

9. Process according to claim 1, in which said contacting is effected in the presence of about 0.02% by weight of water as a reaction initiator.

10. Process according to claim 1, in which said ammonium salt is a member selected from the group consisting of ammonium bicarbonate, ammonium carbonate, ammonium acetate, ammonium chloride, and mixtures thereof, said group member being substantially free of water of crystallization, and in which said contacting is effected at a temperature ranging from normal temperature to about 320° C.

11. Process according to claim 1, in which said ammonium salt is ammonium chloride and in which said contacting is effected at a temperature between about 200 and 320° C.

References Cited in the file of this patent

UNITED STATES PATENTS

| | | |
|---|---|---|
| 2,122,122 | Woodstock | June 28, 1938 |
| 2,708,619 | Winnicki et al. | May 17, 1955 |

OTHER REFERENCES

"Encyclopedia of Chemical Technology," Kirk-Othmer, Band 10, page 482, 1953.